F. X. DION.
SCALE.
APPLICATION FILED MAR. 28, 1916.
1,231,003.
Patented June 26, 1917.
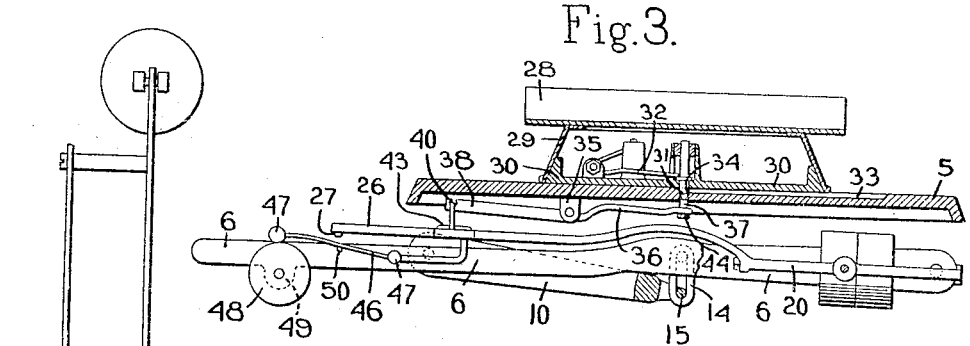
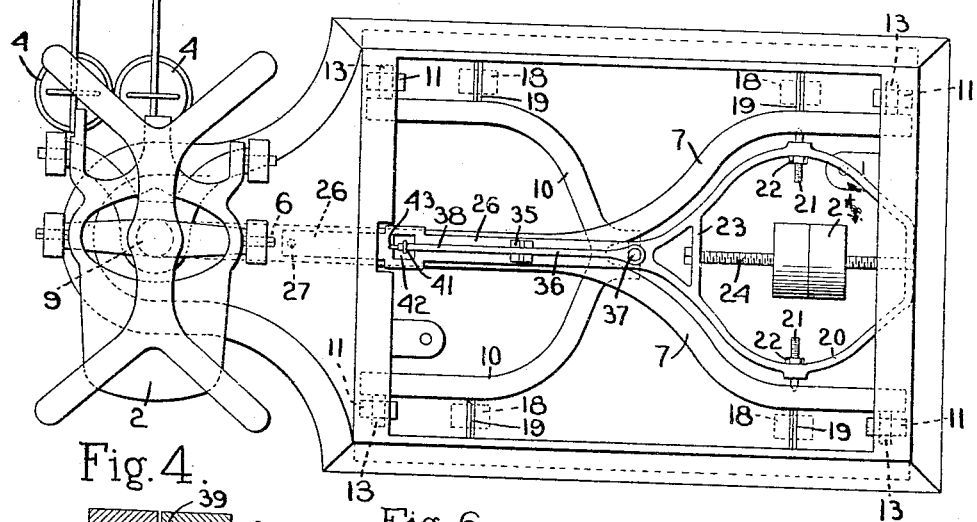
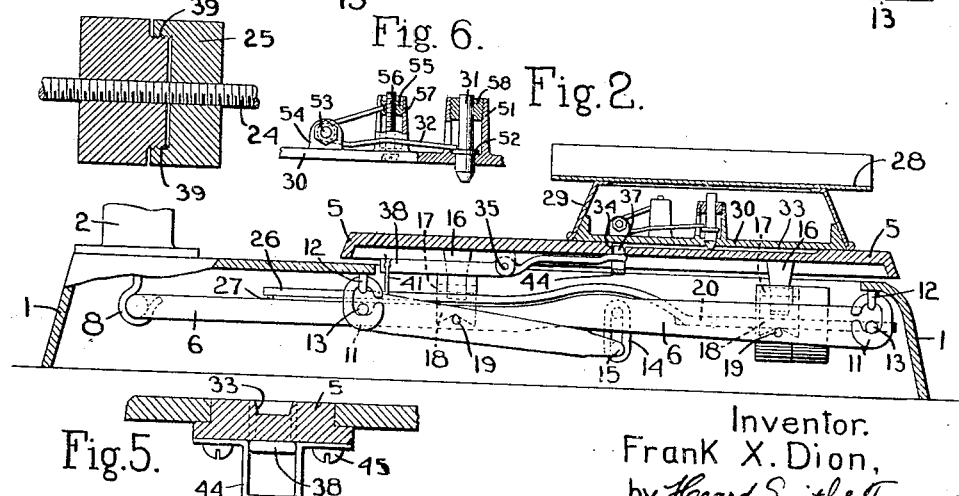
Inventor.
Frank X. Dion,
by Heard Smith & Tennant.
Attys.

UNITED STATES PATENT OFFICE.

FRANK X. DION, OF LYNDONVILLE, VERMONT.

SCALE.

1,231,003.   Specification of Letters Patent.   Patented June 26, 1917.

Application filed March 28, 1916. Serial No. 87,332.

*To all whom it may concern:*

Be it known that I, FRANK X. DION, a subject of the King of Great Britain, and resident of Lyndonville, county of Caledonia, State of Vermont, have invented an Improvement in Scales, of which the following description, in connection with the accompanying drawing, is a specification, like characters on the drawing representing like parts.

This invention relates to improvements in scales and more particularly to that class thereof known as platform scales.

It has been common in this art to construct platform scales which automatically tare the weight of the scoop or similar receptacle necessarily employed in weighing certain kinds of articles. Automatically shifting weights have been provided on beam levers in order to compensate for such receptacles; mechanisms have also been employed which function automatically to pick up a weight from a rest to achieve the taring object. Herein, compensation is had for the scoop weight by means of a novel supplemental lever system.

An object of this invention is to provide means for automatically counterbalancing the weight of a scoop or similar receptacle when placed upon the scales.

Another object is to provide means for signaling when the mechanism of the scales has functioned to tare the scoop weight.

Other objects of the invention will more fully appear from the following description and the accompanying drawings and will be pointed out in the annexed claims.

In the accompanying drawings, there has been disclosed a selected structure designed to carry out the objects of this invention; but it is to be understood that the invention is not to be confined to the exact features shown, as various changes may be made within its reasonable scope.

Figure 1 is a plan view of the scales with the platform removed;

Fig. 2 is a longitudinal section, some of the parts being omitted, the levers being shown in elevation;

Fig. 3 is a modification showing the scoop in the balanced position;

Fig. 4 is a sectional detail of the adjustable compensating weight;

Fig. 5 is a sectional detail on the line 5—5 of Fig. 1, showing the lever guard and having added the platform in section.

Fig. 6 is an enlarged detail of the scoop plunger mechanism.

In this selected embodiment, the scale frame 1 is of ordinary construction and has, arising therefrom at its rearward end, the standard 2. The beams 3 project therefrom at substantially right angles and have marked thereon the usual graduations to denote, by means of the movable weights 4, the weight of the various loads which may be positioned upon the platform 5 of the scales. This platform is supported upon the usual system of levers. Herein is provided the bifurcated long lever 6, the two forward arms 7 of which are pivotally supported at the frame front. These arms join to form the main body of the long lever 6 which is pivotally supported at its rear end by the hook 8 depending from the upright rod 9 which is reciprocable in the standard 2. The rear lever 10 is generally U-shaped in plan view and its arms are pivotally supported at the rear end from the frame 1. These end supports of the four arms of the levers 6 and 10 are of a common type and each consists as illustrated in Fig. 2 of a ring 11 depending from a frame-held staple 12. The rings are split to offer facile means for the introduction of the pivot 13 of each of the four lever ends. The long lever 6, which is substantially Y-shaped, has a ring 14 depending therefrom at the juncture of its arms 7. This ring 14 pivotally supports the forward pivot 15 of the U-shaped lever 10. The platform 5 of the scales is supported at its four corners by means of their respective projections 16 which are preferably secured by pins 17 to the blocks 18. The under face of each of the four blocks is substantially V-grooved to rest upon the four knife edge pivots 19 carried by the levers 6 and 10. The platform, as is usual, is thus mounted so that the weight of objects placed thereon is accurately determined through its communication to the platform levers to the upright rod and the usual beams.

Herein, instead of the common shifting weight structure, there is employed a novel taring lever so disposed that its rear end normally rests upon the rear portion of the long lever adjacent the standard. This taring lever rests in such normal position when the scoop is not operatively positioned upon the platform. But, when the scoop is properly so positioned, the forward end of this taring lever is raised from such contacting position and held away from the long lever at its rear end portion—the whole weight of the taring lever being borne by the long lever at its forward or bifurcated end. Its weight is therefore shifted with respect to the fulcrum of the platform lever system and compensation is had for the scoop weight.

A selected embodiment of such novel lever is here shown as applied to the usual scales mechanism. The forward portion of the taring lever consists preferably of a loop 20. This loop may be pivotally supported by knife edges or similar means and is here shown as having opposed apertures at substantially its widest points to receive the balancing pivots 21 locked in position by the nuts 22. The loop 20 has a transverse bar 23, adjacent the rearward juncture of the loop members, which supports one end of a threaded stem 24 upon which is received in threaded engagement a two-part self-locking balancing weight 25. The forward end of the threaded stem is received through the loop at its forward portion and thereby is supported. Rearwardly of the loop 20, the lever is formed of a single taring lever arm 26. The rear end of this arm has secured thereto a contact button 27 which is constructed to form the contact of the taring arm 26 and the long lever 6. The normal position of the taring lever or arm 26 may be considered that in which the contact button 27 of the taring lever is positioned and resting upon the long lever 6, as shown in Fig. 2. Such position is that assumed when the scoop is not being employed, or, that assumed when the scoop is so positioned upon the platform as not to cause the taring lever automatically to function and thus not to cause the displacement of the contact button. Such normal contacting position is shown in Fig. 2.

In order to cause the scoop automatically to achieve such taring function, it is provided with an instrumentality which accomplishes such object through actuation of a supplemental lever. A form of scoop constructed to effect such operation is here shown and consists of an ordinary scoop body 28, the annular base 29 of which has a transverse bar 30 upon which is secured a recessed projection 51 in which is mounted a plunger 31 normally held in outward position by means of the spring 32, the end portion of which engages a collar 52 secured to the plunger 31. Means are preferably provided whereby the tension of the spring 32 upon the collar may be varied. An enlarged detail of a selected embodiment is disclosed in Fig. 6 wherein the centrally recessed projection 51 is slotted to receive, and to permit the reciprocatory movement of, the spring end portion. The spring is coiled about a screw 53 carried in an ear 54 on the bar 30 and has its opposite end secured in a screw block 55 movable in threaded engagement on the screw 56. The projection 57 on the bar 30 is recessed to receive the screw 56 and its block 55 so that, upon turning of the screw, the block 55 is given a movement longitudinally the recessed projection, carrying with it the end of the spring 32 so that more or less tension is placed upon the plunger end. The upper end portion of the plunger projection 51 is interiorly threaded to receive in such engagement the bearing collar 58 which functions to offer a guiding media to the upper end of the spring-pressed plunger 31.

The upper face of the platform has a groove 33, the sides of which are suitably beveled to receive the outwardly spring-pressed plunger as the scoop is slid across the face of the platform. This groove 33 extends from a point near the forward edge of the platform approximately to the center of the platform and terminates in an aperture 34 through which the plunger may project. The supplemental lever is pivotally supported by the bracket 35 secured to the under face of the platform 5. The forward portion 36 of this lever extends beneath the aperture 34 at which point the supplemental lever has secured thereto a stud 37. The opposite or rear end portion 38 of the supplemental lever extends above the taring lever to the point where means are provided whereby the taring lever may be lifted from contact with the long lever as shown in Fig. 3.

The balancing weight, positioned transversely the loop 20 of the taring lever, functions to provide a medium to insure proper balance of the added parts. This balancing weight comprises two members received in threaded engagement on the stem 24. As shown in Fig. 4, one member has an annular shoulder received in threaded engagement by the flange of the other member. The pitch of the threads 39 of the two members is different from that of the two members on the threaded stem 24 so that relative movement may be obtained between the two members. Such movement gives rise to a jamming function which securely locks the weight in any desired position upon the stem 24.

The contact between the taring lever and the long lever is well toward the rear from the fulcrum of the long lever and hence the weight of the taring lever exerts a greater influence upon the long lever than it does in raised operative position when the weight of the taring lever is carried by the platform and therefore by the platform fulcrum. The rearward end portion of the supplemental lever is provided with a simple means for raising the taring lever and in this preferred embodiment consists of a notch 40 wherein is positioned a depending link 41 which freely passes through an aperture 42 formed in the taring lever. A link-engaging member such as a wire staple 43 is secured to the sides of the aperture 42 and positioned longitudinally the taring lever 26. This link engages the staple 43 and in such manner raises the taring lever only when the supplemental lever 38 which carries the link 41 is raised by the proper positioning of the spring-pressed plunger 31 in the platform groove aperture. A protecting means is preferably provided for the stud 37 carried on the front end of the supplemental lever 38. Such a means is disclosed in the detail view in Fig. 5 in which a guard 44, substantially U-shaped is secured as by screws 45 to the underface of the platform 5.

It is often desirable that signaling means be provided to show that the taring mechanism has functioned. In this embodiment, there is provided a signaling means of the audible type which is shown in Fig. 3. Therein, a lever 46, preferably of a somewhat resilient material, is mounted upon the long lever 6 by means of the pivot 47. The forward end of this lever is upwardly bent and is normally downwardly held by means of the lever 26, that is, when in the normal inoperative position shown in Fig. 2. The rear end has secured thereto a bell hammer 47 adapted to strike a bell 48 mounted upon an ear 49 of the long lever 6. A pin 50 is affixed to the long lever in such manner that, upon the raising of the taring lever by the emplacement of the scoop, the pin 50 catches the lever while its resiliency causes the hammer to strike the bell.

There is thus provided a durable and efficiently accurate taring mechanism for scales. This novel organization is automatic in function and is simple in manipulation and operation. The spring-actuated plunger 31 of the scoop engages the slot 33 of the platform as the scoop is slid transversely thereacross. Being in such engagement, the scoop is adequately guided as it is rearwardly pushed until the plunger enters the slot-end aperture when the spring causes the plunger downwardly to press the forward end of the pivoted supplemental lever 38 which in turn raises the rear end of the taring lever 26 out of contact with the long lever 6. The weight of the taring lever is then removed from adjacent the rear end of the long lever where it is away from the effective fulcrum and therefore has the greater balancing function.

It is to be understood that the construction disclosed herein is illustrative but not restrictive and that the same may be modified within the meaning and scope of the claims which follow.

Having fully described my invention, what I claim as new and desire to secure by Letters Patent is:

1. In weighing scales, the combination of a weighing lever, a scoop taring lever having one end normally supported by said lever and means for causing the positioning of the scoop upon the platform to remove said lever end from said position whereby the scoop weight is counterbalanced.

2. In weighing scales, the combination of weighing levers; a scoop taring lever pivotally mounted adjacent one of its ends upon one of said levers, the other end bearing upon said weighing lever beyond the fulcrum thereof; and means for causing the positioning of the scoop upon the platform to shift the weight of the taring lever with respect to said fulcrum whereby the scoop weight is counterbalanced.

3. In weighing scales, the combination of a scoop balancing device comprising a weighing lever system, a scoop taring lever having one end normally resting upon a portion of said lever system, a balancing member carried by said taring lever and adjustable to secure normal equilibrium of the scales, and means for causing the positioning of the scoop upon the platform to shift the weight of the taring lever with respect to the fulcrum of the weighing lever system whereby the equilibrium of the scales is maintained.

4. In weighing scales, the combination of a scoop balancing device comprising a weighing lever system, an apertured platform supported thereby, a scoop taring lever having one end normally resting upon a portion of said lever system, a scoop, a spring-pressed member on said scoop adapted to enter the platform aperture, means positioned beneath said platform aperture to engage the taring lever whereby, when the scoop is operatively positioned upon the platform, said spring-pressed member tensionably will cause the taring lever to shift the weight thereof with respect to the lever system fulcrum so that compensation is had for the weight of the scoop.

5. In weighing scales, the combination of coöperating weighing levers, a scoop taring lever pivotally mounted on said coöperating levers and having an end in engagement with one of said levers beyond the fulcrum thereof, means carried by the platform operable to disengage said taring lever end whereby the balance of said coöperating weighing levers is altered, a scoop, and means on the scoop to actuate said disengaging means whereby the weight of the scoop is counterbalanced.

6. In weighing scales, the combination of coöperating weighing levers, a scoop taring lever having an end in engagement with one of said levers beyond the fulcrum thereof, a supplemental lever on the scales platform and operable to disengage the taring lever end whereby the balance of said coöperating levers is altered, a scoop and means operable, upon the positioning of the scoop, to actuate said supplemental lever whereby the weight of the positioned scoop is counterbalanced.

7. In weighing scales, the combination of coöperating weighing levers, a scoop taring lever pivotally mounted on the coöperating weighing levers and having an end in engagement with one of said levers beyond the fulcrum thereof, a supplemental lever pivotally mounted on the scales platform and operable to disengage the taring lever end whereby the balance of the coöperating weighing levers is altered, a scoop and means operable, upon the positioning of the scoop, to actuate the supplemental lever whereby the weight of the positioned scoop is counterbalanced.

8. In weighing scales, a scoop balancing device comprising coöperating weighing levers, a scoop taring lever pivotally mounted on the coöperating levers and having an end in engagement with one of said levers beyond the fulcrum thereof, a balancing member carried by said taring lever and adjustable to secure normal equilibrium of the scales, a supplemental lever pivotally mounted on the scales platform and operable to disengage the taring lever end whereby the scales equilibrium is altered, a scoop, and means operable, upon the positioning of the scoop, to actuate the supplemental lever whereby the scoop weight is counterbalanced and the scales equilibrium maintained.

9. In weighing scales, the combination of a scoop balancing device comprising coöperating weighing levers, a scoop taring lever having an end resting upon one of said levers beyond the fulcrum thereof, means for causing the positioning of a scoop upon the scales platform to change the position of the taring lever end whereby the equilibrium of the scales is maintained, and signaling means automatically operable to indicate the functioning of the taring lever.

10. In weighing scales, the combination of a scoop balancing device comprising a weighing lever system, an apertured platform supported thereby, a scoop taring lever having one end normally resting upon a portion of said lever system, a scoop, a spring-pressed member on said scoop adapted to enter the platform aperture, means operable to adjust the tension of said spring on said member, means positioned beneath said platform aperture to engage the taring lever whereby, when the scoop is operatively positioned upon the platform, said spring-pressed member tensionably will cause the taring lever to shift the weight thereof with respect to the lever system fulcrum so that compensation is had for the weight of the scoop.

In testimony whereof I have signed my name to this specification.

FRANK X. DION.

Copies of this patent may be obtained for five cents each, by addressing the "Commissioner of Patents, Washington, D. C."